March 30, 1965    R. GOULET ETAL    3,175,633
ENDLESS TREAD SELF-PROPELLED VEHICLE
Filed Nov. 5, 1962    4 Sheets-Sheet 1
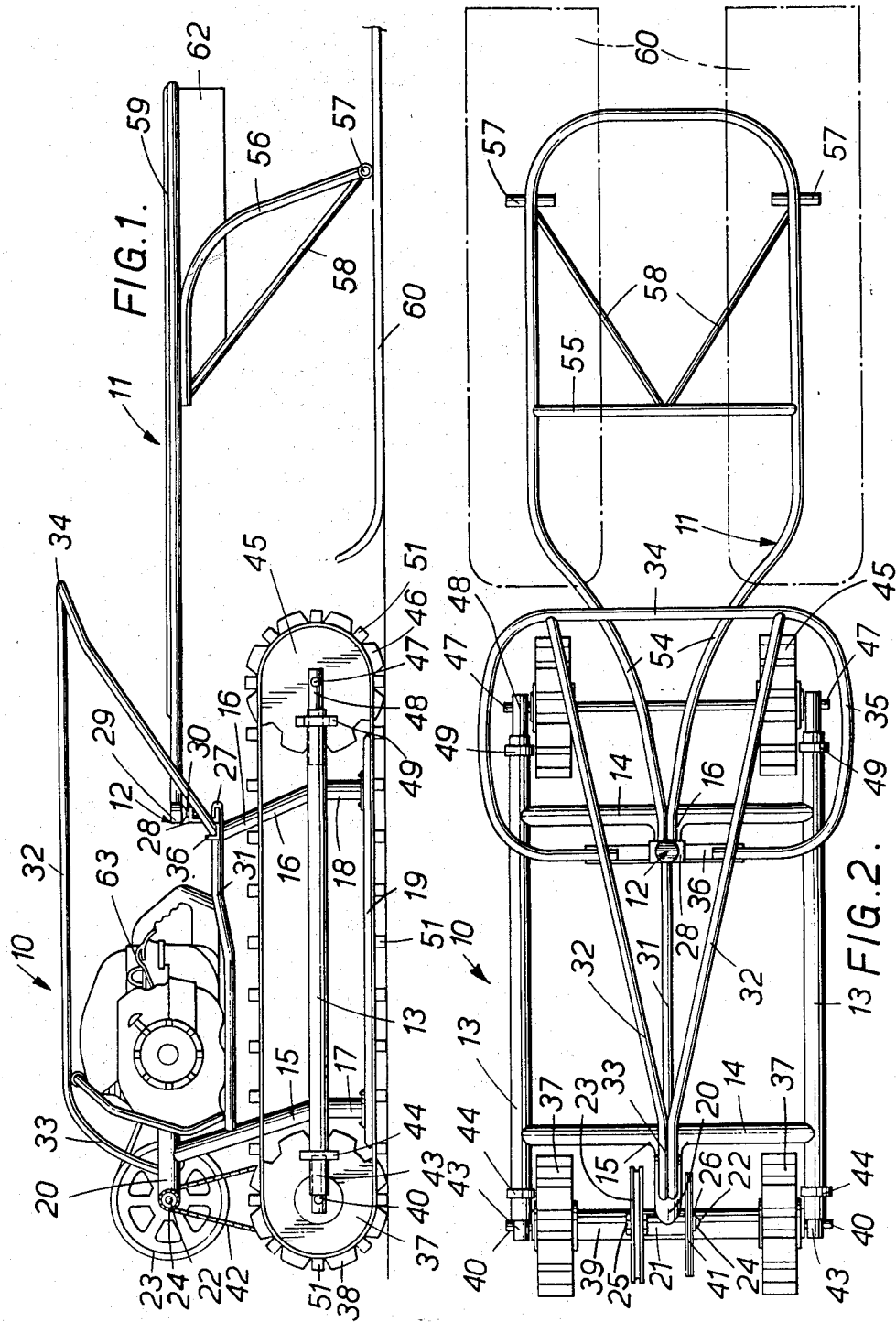

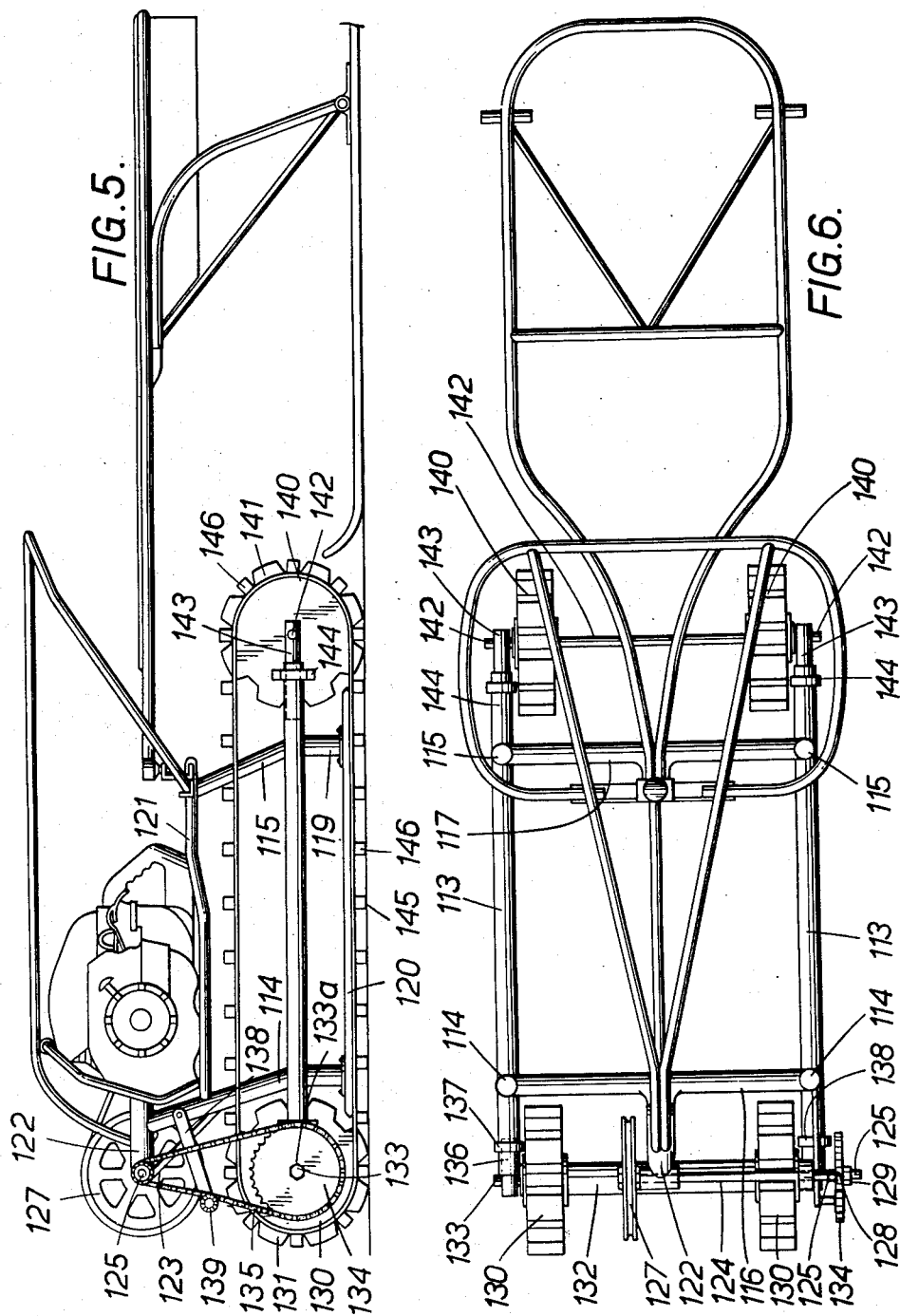

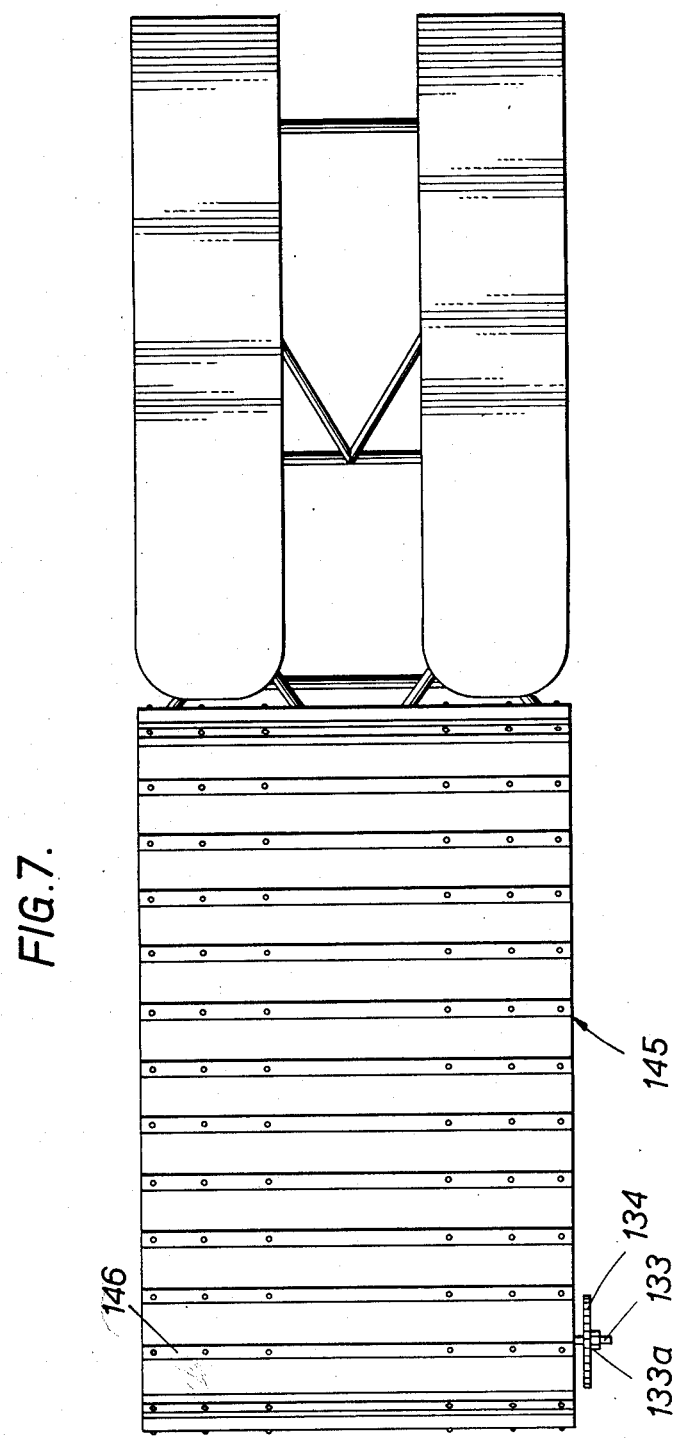

United States Patent Office 3,175,633
Patented Mar. 30, 1965

3,175,633
ENDLESS TREAD SELF-PROPELLED VEHICLE
Roger Goulet, 531 Tachereau E., and Theophile Goulet, 159 Latulipe E., both of Rouyn, Quebec, Canada
Filed Nov. 5, 1962, Ser. No. 235,362
Claims priority, application Canada, May 18, 1961, 823,718
3 Claims. (Cl. 180—5)

This application is a continuation-in-part of application Serial No. 122,448, filed July 7, 1961 (now abandoned).

This invention relates to an endless tread self-propelled vehicle. More particularly, it is directed to such vehicle particularly adapted for running on snow or ice.

A number of vehicles of the general type referred to herein have been suggested in the past. Thus, one type of vehicle is the snowmobile, equipped with skis and power driven caterpillar treads. These types of vehicles have not been entirely satisfactory. One disadvantage is that the tread construction was such that the endless tread tended, under certain conditions, to dig itself into the snow, causing the vehicle to come to rest.

In addition, vehicles of this type require a high type of maneuverability, particularly enhanced traction, ease of steering and ease of manually moving the vehicle when desired. Once disadvantage frequently inherent in such endless tread vehicles was that a transmission was frequently necessary to operate the separate treads, to drive one faster than the other when turning a corner. Such transmissions are expensive, and the vehicles are heavy and costly to operate.

Other disadvantages of the vehicles heretofore suggested were that being relatively heavy, they were difficult to maneuver and were incapable of turning in a very short radius.

A further disadvantage of the vehicles heretofore suggested was that, when traveling over terrain which consists of snowdrifts, the vehicle would behave in a manner which was unsuitable. Thus, if the angle of the snowdrift was too great, the vehicle either would dig itself into the snowdrift or, alternatively, would, because of the position of its center of gravity, tip over.

Accordingly, one feature of the present invention is the provision of a light-weight vehicle which is easy to maneuver.

Another feature of the present invention is the provision of a simple steering mechanism whereby a very small radius of turn of the vehicle may be achieved.

Another feature of the present invention is the provision of a vehicle which may climb steep slopes while not having the disadvantage of digging into the slope or tipping over.

Still another feature of the present invention is the provision of a vehicle in which the traction may be varied by shifting the weight of the rider rearwardly or forwardly.

Thus, the present invention provides, in its broadest aspect, a vehicle comprising: a front frame, including at least one terrain-engaging track adapted to propel said vehicle, said track entraining a forward whel mounted on a forward axle and a rearward wheel mounted on a rearward axle, at least one of said wheels being a drive wheel, and a rearwardly directed handle; a rear carrying frame, including a terrain-engaging surface; and means pivotally connecting said front frame with said rear frame, said connecting means being capable of both lateral and vertical pivoting and being positioned forward of said rearward axle and rearward of said forward axle. The term "lateral pivoting" as used herein means rotation about a substantially horizontal axis, and the term "vertical pivoting," as used herein means rotation about a substantially vertical axis. The preferred pivotal connecting means in the present invention is a ball-and-socket joint, which permits substantially simultaneous lateral and vertical pivoting.

In its most preferred embodiment, the present invention provides a vehicle comprising; a front frame including a pair of spaced terrain-engaging tracks, each track entraining a forward drive wheel mounted on a forward axle and a rearward idler wheel mounted on a rearward axle, each track comprising a pair of spaced track portions joined by a plurality of spaced transverse terrain-engaging cleats, each track including a runner fixed to the front frame between said forward wheel and said rearward wheel and adapted to contact the exposed upper surface of said cleats between the track portion of the lower running section of the track, and a rearwardly directed handle; a rear frame including a terrain-engaging surface, said rear frame comprising a unitary, generally rectangular framework, composed of a rear transverse end member and substantially parallel side members which converge at their forward portions to a bifurcated tongue, a seat attached to said generally rectangular framework, a pair of legs, each leg depending from a side member, a pair of skis, each ski being pivotally connected to a leg at one end thereof, and a pair of braces, each brace extending from said generally rectangular framework to the area of connection of one said leg and one said ski, and a pair of braces, each brace extending from said generally rectangular framework to the area of connection of one said leg and one said ski; and a ball-and-socket joint pivotally connecting said front frame with said rear frame, said ball-and-socket joint being positioned forward of said rearward axle and rearward of said forward axle.

In drawings which illustrate example embodiments of the present invention:

FIG. 1 is a side elevation of a vehicle according to the invention;

FIG. 2 is a top plan view of the frames of the embodiment of FIG. 1;

FIG. 5 is a side elevation of another embodiment of a vehicle according to the invention;

FIG. 6 is a top plan view of the frames of the embodiment of FIG. 5, and

FIG. 7 is a bottom plan view of the embodiment of FIG. 5.

Figure 3:
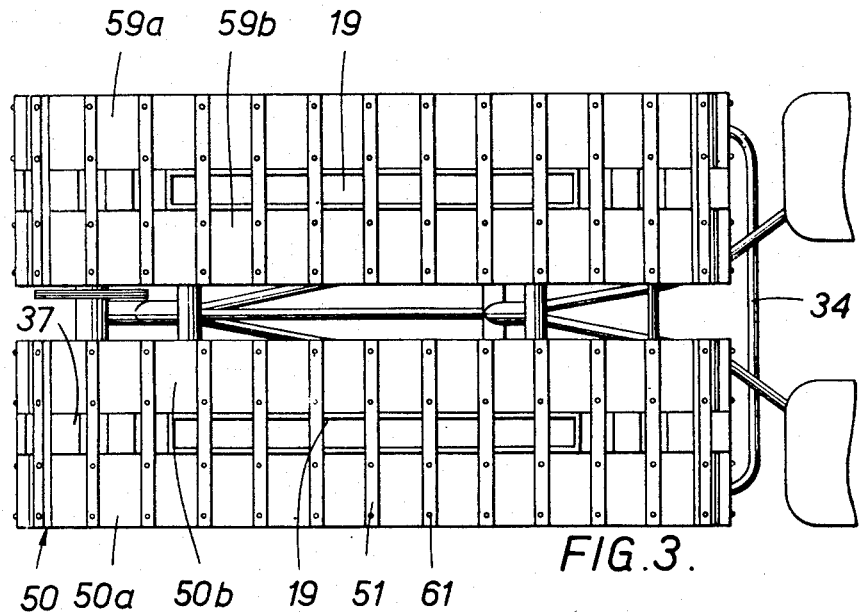
FIG. 3 is a bottom plan view of the embodiment of FIG. 1.

Referring to FIGS. 1 and 2 it is seen that the vehicle comprises a front frame indicated generally at 10, a rear carrying frame, indicated generally at 11 and a connecting means, indicated generally at 12. The front frame consists of two major spaced-apart longitudinal tubular members 13, to which are welded two major transverse tubular members 14. A front post 15 is welded centrally to the forward transverse member 14 and a rear post 16 is welded centrally to the rearward transverse member 14. Depending from each of the major longitudinal members 13 is a front leg 17 and a rear leg 18. Joined to each pair of legs 17 and 18 is a longitudinal, flat, runner 19 whose operation will be described hereinafter. At the top of front post 15 is welded a longitudinal stub member 20, whose front end is journaled to accept a bearing 21. Bearing 21 receives a transverse shaft 22, which has mounted thereon a V-belt drive pulley 23 and a toothed sprocket wheel 24. Drive pulley 23 is retained on shaft 22 by hexagonal nut 25, while driven sprocket 24 is held to shaft 22 by hexagonal nut 26.

Welded to the top of rear post 16 is plate 27 integral with a U-shaped bracket 28 on which is mounted the ball (not shown) of a ball-and-socket hitch 29 by means of shaft 30. As mentioned hereinbefore the ball-andsocket hitch permits the substantially simultaneous lateral and vertical pivoting which has been defined above. Welded to the top of post 16 and to the mid-point of post 15 is a curved tubular central longitudinal supporting member 31.

A handle, composed of horizontal braces 32 and a rear transverse gripping portion 34, is mounted on frame 10. Braces 32 have downwardly curved forward legs 33 welded to stub member 33', while gripping portion 34 has downwardly directed extensions 35 fixed to rear post 16 through lower transverse brace 36.

The drive mechanism of the vehicle comprises a pair of front drive wheels 37 each provided with spaced teeth 38, fixedly mounted to a tubular axle 39 in which are provided bearings (not shown) and a transverse axle shaft 40. A tooth drive sprocket 41 is coaxially mounted on the tubular axle 39, and is driven by a chain 42 by toothed sprocket wheel 24. Each end of shaft 40 passes through a pair of aligned holes in tubular stub shafts 43 which telescope into their respective tubular frame members 13 and are retained in position by their associated clamps 44.

The rear, or idler wheels of the vehicle comprise a pair of rear wheels 45 provided with spaced teeth 46 and journaled on a rear axle 47. The ends of rear axle 47 fit into rear stub shaft 48, each of which telescopes into their respective tubular frame members 13 and are retained in position by their associated rear clamps 49.

Entrained on drive wheels 37 and idler wheels 45 are a pair of drive tracks 50, more clearly shown in FIG. 3 and which will be more fully described hereinafter. Spaced along each track 50 are terrain-engaging cleats 51 attached thereon by means of bolts 61. The spacing of the cleats 51 are such that they fit between the teeth 38 and 46 in each of drive wheels 37 and idler wheels 35 respectively. The tension on tracks 50 is adjusted by means of movement of stub shafts 43 and 48 with respect to their associated tubular frame members 13. It is seen from FIG. 3 that each of the tracks 50 comprises an outer track portion 50a and an inner track portion 50b. The track portions 50a and 50b are spaced apart, by cleats 51, a distance substantially equal to the thickness of the drive wheel 37 and the idler wheels 45. In this way drive is imparted directly from the teeth 38 of the drive wheels 37 to the cleats 51. The runner 19 cooperates with the cleats 51 of the tracks 50, for it is adapted to contact the exposed upper surface of the cleats between the track portions 50a and 50b on the lower running section of the track.

The rear carrying frame comprises a main upper tubular portion which consists of a unitary generally rectangular framework composed of rear transverse end member 53 and substantially parallel side members 52 which converge at their forward portions to a bifurcated tongue 54. The bifurcated tongue carries a ball (not shown) of the ball-and-socket hitch 29. The frame is provided with a transverse brace 55. Depending from each of the spaced longitudinal side members 52 is a strut 56, provided with transverse foot 57. Each strut 56 is maintained rigid by a brace 58 running from each foot 57 to the mid-point of transverse brace 55. A seat 59 is mounted on the frame, and depending from the frame is a storage bin 62. A pair of skis 60 are each vertically pivoted intermediate their ends to the transverse feet 57.

Figure 4:
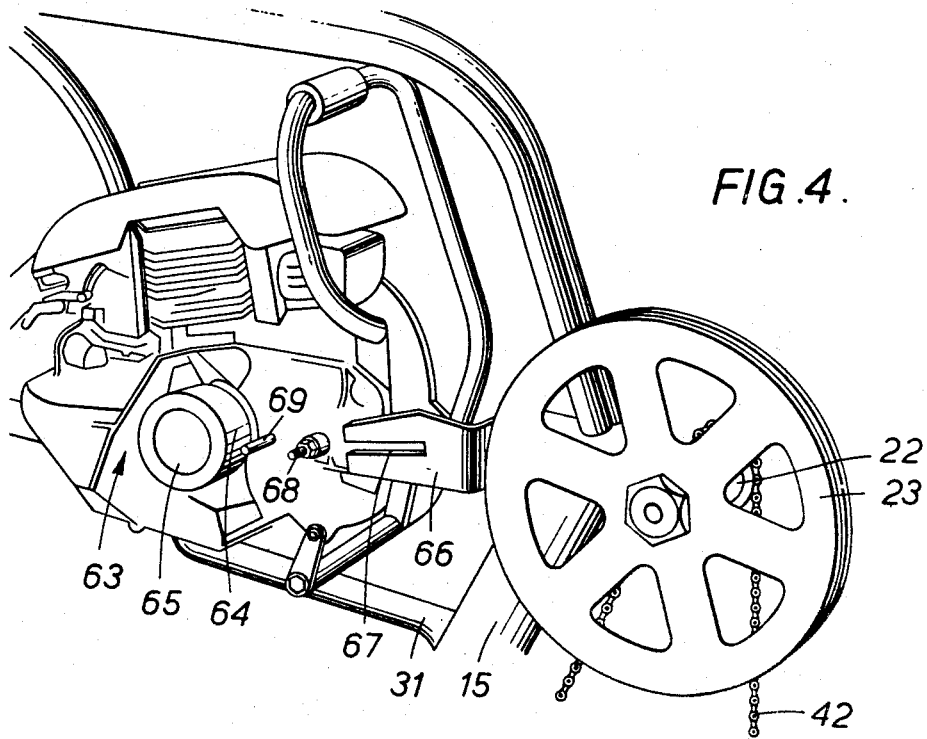
FIG. 4 is a perspective close-up view showing the motor mounting in the embodiment of FIG. 1.

FIG. 4 shows the simple manner in which the motor is detachably mounted on the vehicle. The motor, indicated generally at 63, may be a conventional chain saw motor. The chain saw attachment is removed, and a V-belt pulley 64 mounted on the clutch mechanism 65. A metal plate 66 is provided with a rearwardly facing slot 67 and is welded to the stub-shaft 20. The motor is then slid along the central longitudinal member 31 until a threaded post 68 and a rigid threaded post 69 on the motor frame are within the slot 67. Then a nut (not shown) is screwed onto the threaded post 68 to hold the motor firmly in place. The motor is controlled by the operator through suitable cable means.

In attaching the tracks to the vehicle, they are placed around the wheels and the ends are joined together in a conventional manner as by a pin passing through cooperating loops on the ends of the track. The track is then suitably tensioned by movement of the rear axle, i.e. by telescoping of the rear stub-shafts 43 with respect to their associated tubular longitudinal members 13.

In the operation of the vehicle, the operator sits astride the seat 59 with his feet resting on the front portion of the skis 60 and the operator holds the rear transverse gripping portion 34 of the handle. The vehicle is maneuvered by moving the gripping portion 34 of the handle laterally. The traction of the vehicle may be varied by the operator shifting his weight, either forward or backward along the seat 59. In this way, a varying portion of the operator's weight is transmitted through the ball-and-socket joint to the front frame forward of the rear axle. Thus as will be seen from the drawings, the vertical post 16, on which the ball-and-socket joint is mounted, is situated forwardly of the rear axle and rearwardly of the forward axle.

In another embodiment of the invention shown in FIGS. 5, 6 and 7 the track is a single wide track and the drive is achieved by means of a drive sprocket on the terminal end of the axle of the drive wheel. Since the rear frame is the same in this embodiment, only the front frame will be described.

The front frame comprises a pair of lower longitudinal members 133, a pair of front posts 114 welded thereto, and a pair of rear posts 115 also welded thereto. A front cross-piece 116 is welded to the front posts 114 at a point near the middle thereof, and a rear cross-piece 117 is welded to the rear posts 115 at a point also near the middle thereof. Welded to the mid-point of the rear cross-piece 117 and to the mid-point of front cross-piece 116 is a central longitudinal tubular member 121.

Extending forwardly from the mid-point of front cross-piece 116 is a stub tubular member 122, maintained in rigid position by a brace 123. The stub member 122 is welded to a transverse partial tubular member 124 which is journaled to receive bearings (not shown) and a shaft 125. Mounted on the inner end of shaft 125, by means of hexagonal nut 26, is a drive V-belt pulley 127. Drive pulley 127 and shaft 125 is thus operatively connected to a drive toothed sprocket 128 which is also mounted on shaft 125 by means of a hexagonal nut 129.

The drive mechanism for this embodiment is similar to the drive mechanism of the previous embodiment. Thus, it comprises a pair of front drive wheels 130 each provided with teeth 131, and each being fixedly mounted to a tubular axle 132, in which are provided bearings (not shown) and a transverse axle shaft 133. A toothed drive sprocket 134 is coaxially mounted on the outer end of the shaft 133 and is driven via chain 135 by a toothed sprocket 128. Each end of the shaft 133 passes through a pair of aligned holes in tubular stub shafts 136, which telescope into the front portion of their respective tubular longitudinal members 113, and are retained in position by their associated clamps 137. Mounted on front post 114 is an arm 138, to which is attached an idler sprocket 139 by which means the tension on chain 136 may be adjusted.

The rear or idler wheels, of the vehicle comprise a pair of rear wheels 140 each provided with spaced teeth 141 and journaled on a rear axle 142. The ends of the rear axle 142 fit into rear stub shafts 143 which telescope into the rear portion of their respective tubular longitudinal members 113 and are retained in position by their associated rear clamps 144.

The handle of the front frame of this embodiment is identical to the handle of the front frame of the previous embodiment and will not be described further.

Entrained on drive wheels 130 and idler wheels 140 is a single track 145 provided with spaced cleats 146, as more clearly seen in FIG. 7.

The track is attached to the vehicle in this embodiment in the same manner as it was attached to the previous embodiment.

What we claim is:

1. A vehicle comprising; a front frame, including at least one terrain-engaging track adapted to propel said vehicle, said track entraining a forward wheel mounted on a forward axle and a rearward wheel mounted on a rearward axle, at least one of said wheels being a drive wheel, and a rearwardly directed handle; a rear carrying frame, including a terrain-engaging suface, said rear frame comprising a unitary generally rectangular framework composed of a rear transverse end member and substantially parallel side members which converge at their forward portions to a bifurcated tongue, a seat attached to said generally rectangular framework, a pair of legs, each leg depending from a side member, and a pair of skis, each ski being pivotally connected to a leg at one end thereof; and means pivotally connecting said front frame with said rear frame, said connecting means being capable of both lateral and vertical pivoting and being positioned forward of said rearward axle and rearward of said forward axle.

2. The vehicle as claimed in claim 1, wherein said rear frame includes a pair of braces, each brace extending from said generally rectangular framework to the area of connection of one said leg and one said ski.

3. A vehicle comprising: a front frame including a pair of spaced terrain-engaging tracks, each track entraining a forward drive wheel mounted on a forward axle and a rearward idler wheel mounted on a rearward axle, each track comprising a pair of spaced track portions joined by a plurality of spaced transverse terrain-engaging cleats, each track including a runner fixed to the front frame between said forward wheel and said rearward wheel and adapted to contact the exposed upper surface of said cleats between the track portions on the lower running section of the track, and a rearwardly directed handle; a rear frame including a terrain-engaging surface, said rear frame comprising a unitary, generally rectangular, framework composed of a rear transverse end member and substantially parallel side members which converge at their forward portions to a bifurcated tongue, a seat attached to said generally rectangular framework, a pair of legs, each leg depending from a side member, a pair of skis, each ski being pivotally connected intermediate its end to a leg at one end thereof, and a pair of braces, each brace extending from said generally rectangular framework to the area of connection of one said leg and one said ski; and a ball-and-socket joint pivotally connecting said front frame with said rear frame, said ball-and-socket joint being positioned forward of said rearward axle and rearward of said forward axle.

References Cited by the Examiner

UNITED STATES PATENTS

| | | | |
|---|---|---|---|
| 1,296,022 | 3/19 | Townsend | 180—14 |
| 1,377,609 | 5/21 | Townsend. | |
| 1,530,223 | 3/25 | Young | 180—5 |
| 2,187,970 | 1/40 | Greer. | |
| 2,289,768 | 7/42 | Fehrenbacher | 180—5 |
| 2,483,961 | 10/49 | Ball | 305—16 X |
| 2,528,890 | 11/50 | Lawrence | 180—5 |
| 2,749,189 | 6/56 | France | 305—56 X |
| 2,855,059 | 10/58 | Sutherland | 180—5 X |

FOREIGN PATENTS

| | | |
|---|---|---|
| 178,808 | 6/54 | Austria. |
| 169,463 | 11/59 | Sweden. |

A. HARRY LEVY, *Primary Examiner.*

LEO FRIAGLIA, *Examiner.*